US010127822B2

(12) United States Patent
Damnjanovic et al.

(10) Patent No.: US 10,127,822 B2
(45) Date of Patent: Nov. 13, 2018

(54) DRONE USER EQUIPMENT INDICATION

(71) Applicant: QUALCOMM Incorporated, San Diego, CA (US)

(72) Inventors: Aleksandar Damnjanovic, Del Mar, CA (US); Juan Montojo, San Diego, CA (US); Yongbin Wei, La Jolla, CA (US); Peter Gaal, San Diego, CA (US); Alberto Rico Alvarino, San Diego, CA (US); Edward Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,103

(22) Filed: Sep. 21, 2017

(65) Prior Publication Data

US 2018/0233055 A1  Aug. 16, 2018

Related U.S. Application Data

(60) Provisional application No. 62/458,551, filed on Feb. 13, 2017, provisional application No. 62/458,558, filed on Feb. 13, 2017.

(51) Int. Cl.
*G08G 5/00* (2006.01)
*B64C 39/02* (2006.01)
*G05D 1/00* (2006.01)

(52) U.S. Cl.
CPC ......... *G08G 5/0069* (2013.01); *B64C 39/024* (2013.01); *G05D 1/0022* (2013.01); *G08G 5/0013* (2013.01); *B64C 2201/146* (2013.01)

(58) Field of Classification Search
CPC .. G08G 5/0069; G08G 5/0013; B64C 39/024; G05D 1/0022

(Continued)

(56) References Cited

U.S. PATENT DOCUMENTS 7,107,148 B1 * 9/2006 Bodin .................. G01C 21/005
701/23
7,133,704 B2 * 11/2006 Twitchell, Jr. ..... G06K 7/10079
455/574

(Continued)

OTHER PUBLICATIONS

Ericsson. "Study on Enhanced LTE Support for Aerial Vehicles", 3GPP Draft; RP-162038, SID for Enhanced LTE Support for Aerial Vehicles, 3rd Generation Partnership Project (3GPP), Mobile Competence Centre; 650, Route Des Lucioles; F-06921 Sophia-Antipolis Cedex; France, vol. TSG RAN No. Vienna, Austria; Dec. 5, 2016-Dec. 8, 2016, Dec. 4, 2016, XF051183471, Retrieved from the Internet: URL:http://www.3gpp.org/ftp/Meetings_3GPP_SYNC/ RAN/Docs; [retrieved on Dec. 4, 2016], 6 pages.

(Continued)

*Primary Examiner* — Thomas G Black
*Assistant Examiner* — Wae L Louie
(74) *Attorney, Agent, or Firm* — Muncy, Geissler, Olds & Lowe, P.C.

(57) ABSTRACT

The disclosure relates to drone user equipment (UE) indications that may be conveyed to a wireless network. In particular, a UE that has flight capabilities (i.e., capabilities to operate as an unmanned aircraft system) and optional further capabilities to report a current height level may indicate such capabilities to the wireless network. As such, the wireless network may differentiate the drone UE from other UEs that only operate on the ground. Furthermore, the optional current height level may enable the wireless network to differentiate among drone UEs operating at different heights and/or from other UEs that are operating on the ground. The wireless network may further use the information indicating the flight capabilities either alone or in combination with the optional height information to configure power control parameters, manage interference, provide mobility management functions, generate neighbor lists, (Continued)

control beamforming, or implement a radio resource configuration or management procedure.

24 Claims, 3 Drawing Sheets

(58) Field of Classification Search
USPC ............ 701/23, 307, 467; 367/117; 455/574
See application file for complete search history.

(56) References Cited

U.S. PATENT DOCUMENTS

| | | | | |
|---|---|---|---|---|
| 7,139,258 B2* | 11/2006 | Tillotson | ............... | H04W 74/04 370/337 |
| 9,654,200 B2* | 5/2017 | Mazzarella | ............. | H04W 4/90 |
| 9,656,749 B1* | 5/2017 | Hanlon | ................ | B64C 39/024 |
| 9,692,498 B2* | 6/2017 | Fan | .................... | H04B 7/18504 |
| 9,736,845 B1* | 8/2017 | Yi | ............................ | G01S 7/023 |
| 2006/0167596 A1* | 7/2006 | Bodin | ................. | G05D 1/0027 701/3 |
| 2006/0167597 A1* | 7/2006 | Bodin | ................. | G01C 21/005 701/3 |
| 2006/0167599 A1* | 7/2006 | Bodin | ................. | G08G 5/0069 701/16 |
| 2006/0167622 A1* | 7/2006 | Bodin | ................... | G05D 1/104 701/467 |
| 2006/0271251 A1* | 11/2006 | Hopkins | ................ | A63H 30/04 701/23 |
| 2014/0018979 A1* | 1/2014 | Goossen | ............. | G08G 5/0034 701/3 |
| 2015/0363717 A1* | 12/2015 | Lim | ................... | G06Q 10/0633 705/4 |
| 2016/0196525 A1 | 7/2016 | Kantor et al. | | |
| 2016/0330771 A1 | 11/2016 | Tan | | |
| 2016/0371985 A1* | 12/2016 | Kotecha | ............... | G08G 5/0034 |
| 2017/0234724 A1* | 8/2017 | Naguib | .................... | G01H 3/08 367/117 |
| 2017/0234966 A1* | 8/2017 | Naguib | .................... | G01S 5/22 367/117 |

OTHER PUBLICATIONS

International Search Report and Written Opinion—PCT/US2018/014353—ISA/EPO—dated Jun. 6, 2018.

* cited by examiner

DRONE USER EQUIPMENT INDICATION

CROSS-REFERENCE TO RELATED APPLICATIONS

The present Application for Patent claims the benefit of U.S. Provisional Application No. 62/458,551, entitled "DRONE USER EQUIPMENT INDICATION," filed Feb. 13, 2017, and of U.S. Provisional Application No. 62/458,558, entitled "DRONE USER EQUIPMENT WITH HEIGHT CAPABILITY INDICATION," filed Feb. 13, 2017, which are each assigned to the assignee hereof and expressly incorporated herein by reference in its entirety.

TECHNICAL FIELD

The various aspects and embodiments described herein generally relate to drone user equipment (UE) indications that may be conveyed to a wireless network such that the wireless network may differentiate the manner in which communications are handled for a drone UE operating in the air relative to a UE operating on the ground.

BACKGROUND

Wireless communication systems have developed through various generations, including a first-generation (1G) analog wireless phone service, a second-generation (2G) digital wireless phone service (including interim 2.5G and 2.75G networks), a third-generation (3G) high-speed data, Internet-capable wireless service, and a fourth-generation (4G) service (e.g., Long-Term Evolution (LTE) or WiMax). A fifth-generation (5G) service (e.g., New Radio (NR)) has been proposed that aims to provide higher capacity than current 4G services, thereby allowing more mobile broadband users per area unit and higher or unlimited data quantities to be consumed per user.

There is currently a push to enable unmanned aircraft systems (UAS), also referred to as unmanned aerial vehicles (UAVs) or, more commonly, as "drones," to operate on commercial LTE networks and networks of the future, including 5G. The goal is to enable future UAS operations, such as Beyond Visual Line of Sight (BVLOS), as regulations evolve to permit them. The ability to fly beyond an operator's visual range could enable successful delivery, remote inspection, and exploration. Wireless technology can bring many advantages to drones such as ubiquitous coverage, high-speed mobile support, robust security, high reliability, and quality of service (QoS).

However, drones may operate at different radio conditions than devices on the ground, as interference conditions at higher altitudes differ from interference conditions on the ground. Furthermore, interference conditions can vary depending on the height at which a drone may be operating. In general, a wireless network may have difficulty differentiating between drones and ground devices and/or between drones operating at different heights. Furthermore, radio resource management (RRM) used to manage co-channel interference, radio resources, and other radio transmission characteristics in wireless communication systems may not be optimized to take into consideration the different radio conditions under which drones and ground devices operate.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, one method to provide a drone UE indication to a wireless network may be to introduce a new "drone UE" category, wherein a drone UE may convey a "drone UE" indicator to the wireless network when connecting to the wireless network. For example, in various embodiments, the drone UE may convey the drone UE indicator using Radio Resource Control (RRC) signaling (e.g., as an Informational Element (IE) included in an RRC connection request). In other examples, the drone UE indicator may be conveyed using non-access stratum (NAS) signaling during an NAS attach procedure, using Medium Access Control (MAC) signaling during a Random Access Procedure (RACH), etc. Furthermore, in various embodiments, the drone UE indicator may be dynamically configured, in that a drone UE may convey the drone UE indicator through RRC signaling, a MAC control element, etc. when the drone UE begins flight and subsequently indicate a switch to a non-drone UE (or ground UE) upon landing. In various embodiments, the drone UE category may further support an uplink (UL) heavy traffic configuration because drone UEs may often be used to stream video, images, etc. on the uplink while ground UEs may have higher downlink (DL) traffic demands.

According to various aspects, another method to provide a drone UE indication to a wireless network may be to introduce an additional drone UE category specific to drone UEs that have a capability to report a current height to the wireless network. For example, when connecting to the wireless network, a drone UE with appropriate height-reporting capabilities may indicate such capabilities and be configured to subsequently report a current height level with or without other measurements. According to various embodiments, the drone UE height reporting may be periodic, event-based (e.g., when the height crosses above and/or below certain values), event-based and periodic, combined with other RRM measurements and reporting, etc. Base stations may find the drone UE height information to be useful to configure power control parameters, manage interference, provide mobility management, generate neighbor lists, control beamforming, and/or implement procedures to configure and/or manage any suitable radio resource (e.g., access stratum signaling).

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
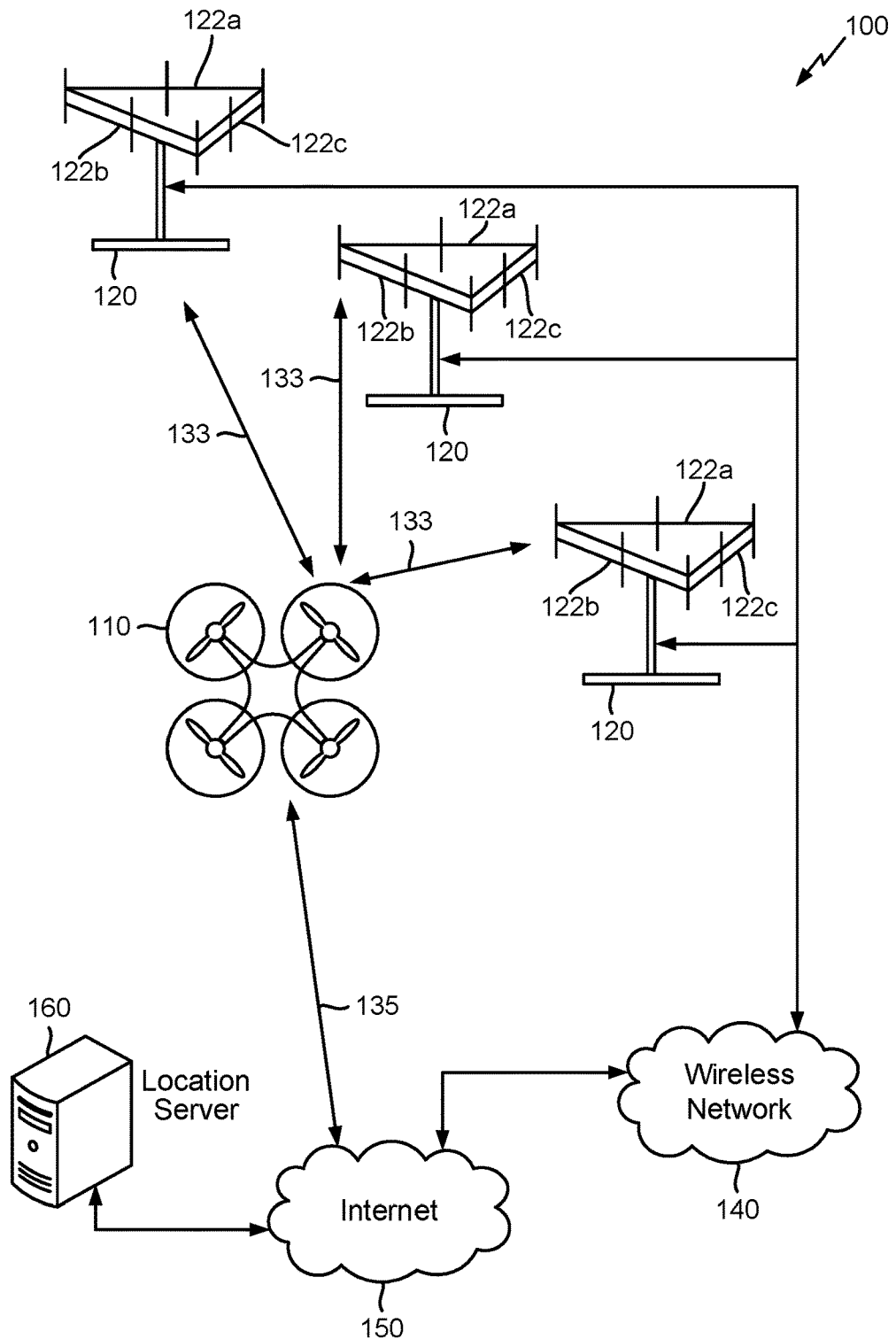
FIG. 1 illustrates an exemplary wireless communications system in which a drone user equipment (UE) may operate, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "drone user equipment" (or "drone UE") and variants thereof may refer to an unmanned aircraft system (UAS) or an unmanned aerial vehicle (UAV) associated with a "drone operator." A drone may be autonomous (self-navigating), remotely controlled, server controlled, beacon controlled, or controlled using multiple control methods in combination. A drone may be used for various purposes such as to perform aerial surveillance, to monitor weather, to perform a communication relay function, to perform data collection, to deploy various commercial and military systems, deliver packages or other purposes. A drone may be owned and operated by a "drone operator," which may include an individual, a commercial or civil operator, or another private, public, or commercial third party, and may be configured to communicate over a suitable wireless network, such as a Long-Term Evolution (LTE) network, a New Radio (NR) network, and/or the like.

As used herein, the terms "area," "coverage area," "geographic area," and variants thereof may refer interchangeably to various manners to delineate or denote area or space. For example, an area as used herein may denote a general area such as a street address or a single point location, such as a GPS coordinate. The area associated with a point or location may also include a radius around the point or location including a vertical radius extending into the airspace above the point or location. An area may also refer to a series of points, which may be denoted using coordinates such as GPS coordinates. The series of points may mark a linear, circular, or irregular boundary. An area may further refer to airspace above land. An area may therefore include the land located within a particular boundary or around a particular location and the airspace directly above and extending to a certain altitude above the designated land (e.g., including buildings, obstructions, terrain features, etc.).

According to various aspects, FIG. 1 illustrates an exemplary wireless communications system 100 in which a drone user equipment (UE) may operate. For example, in various embodiments, the wireless communications system 100 may be configured as a wireless wide area network (WWAN), such as a cellular network, that can utilize mobile telecommunication cellular network technology to enable wireless mobile devices, such as cellular phones, tablet computers, personal digital assistants (PDAs), UAVs, and/or other mobile wireless devices, to transmit and receive data over a large geographical area using cellular towers or base stations.

In various embodiments, the wireless communications system 100 can include at least one drone UE 110, a wireless network 140, base stations 120 (which, in LTE, are referred to as "evolved Node Bs," "eNodeBs," or "eNBs" and, in NR, as "next generation Node Bs," "gNodeBs," or "gNBs"), a location server 160 (which, in LTE, may be an Enhanced Serving Mobile Location Center (E-SMLC) or a Secure User Plane Location (SUPL) Location Platform (SLP)), and the Internet 150. In the example illustrated in FIG. 1, each base station 120 includes three antenna arrays, which include individual antenna arrays 122a, 122b, 122c, collectively referred to as "antenna arrays 122." Each antenna array 122a, 122b, 122c may include one or more transmit and receive antennas and correspond to a "cell" of the base station 120 that can provide cellular connectivity to a drone UE 110 within a coverage area associated therewith. The antenna arrays 122a, 122b, 122c may interact with the drone UE 110 via downlink (DL) and/or uplink (UL) connections. In general, the DL corresponds to communication from an antenna array 122a, 122b, or 122c to the drone UE, while the UL corresponds to communication from the drone UE 110 to an antenna array 122a, 122b, or 122c.

The wireless air interfaces associated with each base station 120, and therefore the antenna arrays 122a, 122b, 122c associated with each base station 120, may operate according to one or more of several radio access technologies (RATs) depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from an organization named "3rd Generation Partnership Project" (3GPP). cdma2000 is described in publicly available documents from an organization named "3rd Generation Partnership Project 2" (3GPP2).

The antenna array 122a, 122b, or 122c providing wireless service to a particular drone UE 110 or other wireless mobile device is referred to herein as the "serving cell" or "serving antenna." Non-serving antenna arrays 122 that the drone UE 110 can suitably detect are referred to as "neighbor cells" or "neighbor antennas," and may be the non-serving antenna arrays 122 of the base station 120 having the serving antenna array 122 and/or antenna arrays 122 of other nearby base station(s) 120. Thus, for example, as the drone UE 110 moves through the wireless communications system 100, a first antenna array 122 of a first base station 120 may serve the drone UE 110 in one location, and in other locations, the drone UE 110 may be served via a different antenna array 122 of the first base station 120, an antenna array 122 of a second base station 120, etc. As used herein, the term "cell" may refer to the actual antenna array 122a, 122b, or 122c providing cellular connectivity in the coverage area of the antenna array 122a, 122b, or 122c, or to the coverage area of the antenna array 122a, 122b, or 122c.

The base stations 120 can be linked to certain geographic areas, and therefore, can be utilized to enable and/or assist with positioning of the drone UE 110. Such positioning may be used, for example, as a complement and/or an alternative to other positioning technologies (e.g., Satellite Positioning System (SPS)). The positioning of the drone UE 110 using base stations 120 may be based on measurements that indicate the distance between the drone UE 110 and the base stations 120. For example, each antenna array 122a, 122b, 122c of the base stations 120 may be configured to transmit radio frequency (RF) signals (such as cell-specific reference signals (CRS) and/or positioning reference signals (PRS)) to enable the drone UE 110 to measure RF signal timing differences between pairs of "cells" (e.g., pairs of antenna arrays 122a, 122b, 122c). The drone UE 110 can either calculate an estimate of a position associated therewith based on these timing difference measurements, or send the measurements to the location server 160 (e.g., using observed time-difference of arrival (OTDOA) positioning) to enable the location server 160 to estimate the position of the drone UE 110. The base stations 120 may be communicatively coupled to the wireless network 140 (e.g., a cellular network), which may be communicatively coupled with the Internet 150. The location server 160 can also be communicatively coupled with the Internet 150. Thus, the drone UE 110 can communicate the timing difference measurements and/or an estimated location to the location server 160 via the Internet 150 and/or other data communication network(s) via a first communication link 133 to one or more base stations 120 and/or via a second communication link 135 used to access the Internet 150 (e.g., via a local wireless network).

Those skilled in the art will appreciate that FIG. 1 provides only a generalized illustration of various components, any or all of which may be utilized as appropriate, and each of which may be duplicated as necessary. For example, although only one drone UE 110 is illustrated in FIG. 1, more than one drone UE 110 may be present in the wireless communications system 100. Furthermore, in many cases, there may be one or more ground UEs present in the wireless communications system 100 along with the drone UE 110 and any other drone UEs that are not explicitly shown in FIG. 1. Similarly, the wireless communications system 100 may include more base stations 120 than the three base stations 120 shown in FIG. 1. Even so, in some implementations, the wireless communications system 100 may have fewer base stations 120. Further, although the base stations 120 are illustrated in FIG. 1 as having three antenna arrays 122 (and thus three "cells") forming a triangle, those skilled in the art will appreciate that there may be more or fewer antenna arrays 122 and/or the antenna arrays 122 may be arranged in different shapes. Furthermore, components may be rearranged, combined, separated, substituted, and/or omitted, depending on the desired functionality. Those skilled in the art will recognize many modifications to the components illustrated.

The various aspects and embodiments described herein contemplate that the drone UE 110 may be implemented using any of various suitable drone configurations. For example, a flight power source for the drone UE 110 may be one or more propellers that generate a lifting force sufficient to lift the drone UE 110 (including the structure, motors, electronics, and power source associated therewith) in addition to any loads that may be attached to the drone UE 110. The flight power source may be powered using an electrical power source such as a battery. Alternatively, the flight power source may be a fuel-controlled motor, such as one or more internal combustion motors. While the present disclosure is directed to example electric motor-controlled drones, the concepts disclosed herein may be applied equally to drones powered using virtually any power source. Flight power sources may be vertically or horizontally mounted depending on the flight mode of the drone UE 110. Furthermore, the drone UE 110 may be configured with processing and communication devices that enable the drone UE 110 to navigate, such as via controlling the flight motors to achieve flight directionality and to receive position information and information from other system components including beacons, servers, access points, and so on. The position information may be associated with the current drone position, way points, flight paths, avoidance paths, altitudes, destination locations, charging station locations, etc.

In general, one common configuration suitable for use in the various aspects and embodiments described herein is a "quad copter" configuration, as shown in FIG. 1. In an example quad copter configuration, typically four horizontally configured rotary lift propellers and motors are fixed to a frame, although more or fewer rotary lift propellers and motors may be used. The frame may include a frame structure with landing skids that supports the propulsion motors, power source (e.g., battery), payload securing mechanism, and so on. A payload may be attached in a central area underneath the frame structure platform of the drone UE 110 (e.g., in an area enclosed by the frame structure and skids underneath the flight power sources or propulsion units). A quad copter-style horizontal rotor drone may fly in any unobstructed horizontal and vertical direction or hover in one place. In the example shown in FIG. 1, a quad copter drone configuration is used for illustrative purposes. However, other designs may be used.

Figure 2:
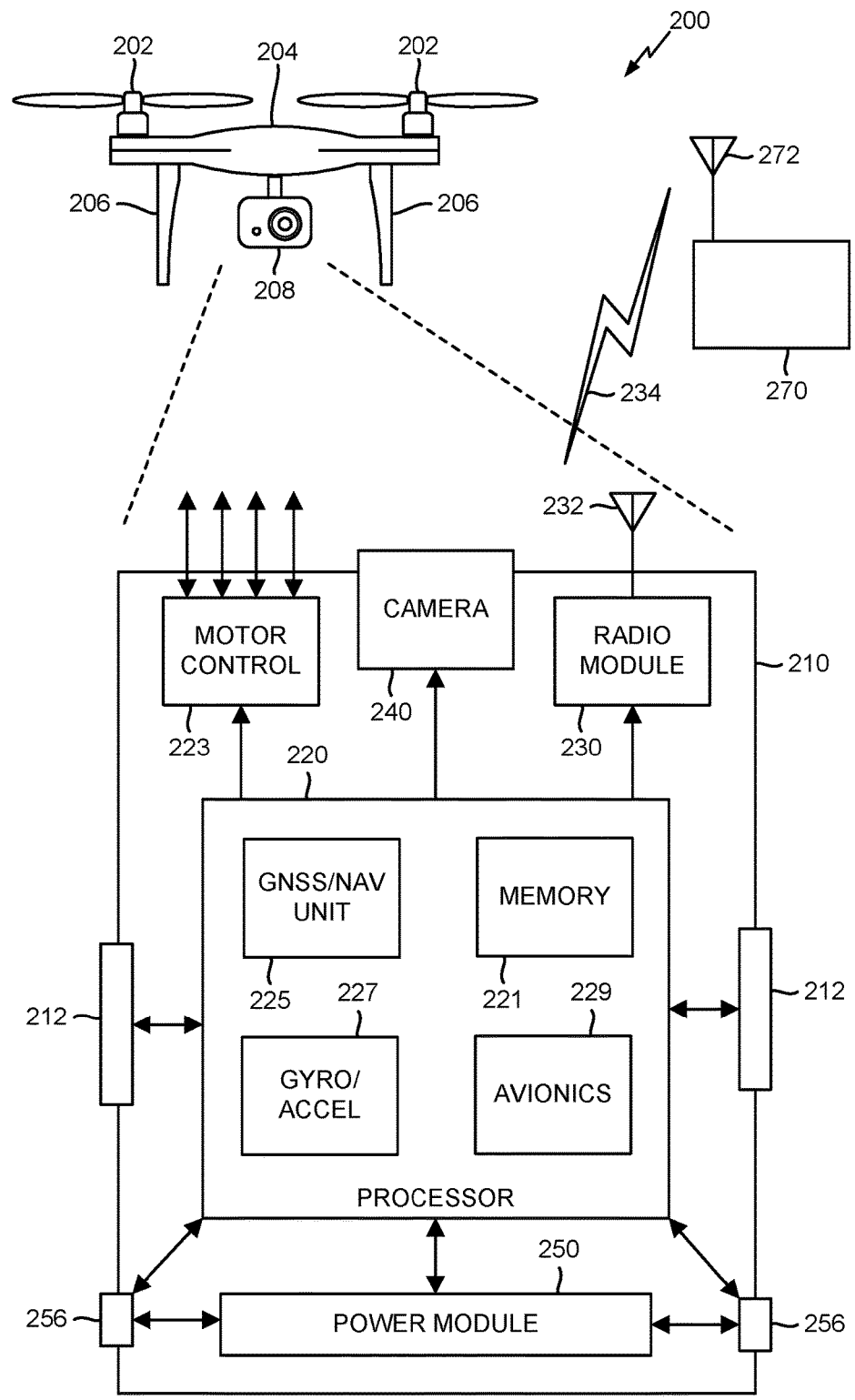
FIG. 2 illustrates an exemplary drone UE that may be configured in accordance with the various aspects and embodiments described herein.

According to various aspects, FIG. 2 illustrates an exemplary drone UE 200 that may be configured in accordance with the various aspects and embodiments described herein. For example, in the particular embodiment illustrated in FIG. 2, the drone UE 200 may include a number of rotors 202, a frame 204 and landing skids 206. The drone UE 200 may further include a control unit 210 that may house various circuits and devices used to power and control the operation of the drone UE 200, including motors for powering the rotors 202, a battery, a communication module, and so on. The frame 204 may provide structural support for the motors associated with the rotors 202, the landing skids 206 and may be sufficiently strong to support the maximum load weight for the combination of the components of the drone UE 200 and, in some cases, a payload 208, shown in FIG. 2 as including a camera 240. For ease of description and illustration, some detailed aspects of the drone UE 200 are omitted such as wiring, frame structure interconnects, and/or other features that would be known to those skilled in the art. For example, while the drone UE 200 is shown and described as having a frame 204 and having a number of support members or frame structures, the drone UE 200 may be constructed using a molded frame in which support is obtained through the molded structure. In the illustrated embodiments, the drone UE 200 has four rotors 202. However, more or fewer than four rotors 202 may be used.

In various embodiments, the landing skids 206 of the drone UE 200 may be provided with or otherwise coupled to landing sensors 256. The landing sensors 256 may be optical sensors, radio sensors, camera sensors or other sensors. Alternatively or additionally, the landing sensors 256 may be contact or pressure sensors that may provide a signal that indicates when the drone UE 200 has made contact with a surface. In some embodiments, the landing sensors 256 may be adapted to provide the additional ability to charge a drone battery when the drone UE 200 is positioned on a suitable landing pad, such as through charging connectors (not explicitly shown in FIG. 2). In some embodiments, the landing sensors 256 may provide additional connections with a landing pad, such as wired communication or control connections.

In various embodiments, the drone UE 200 may further be equipped with a payload-securing unit 212. The payload-securing unit 212 may include an actuator motor configured to drive a gripping and release mechanism and related controls that are responsive to the control unit 210 to grip and release the payload 208 in response to commands from the control unit 210.

According to various aspects, in the example configuration shown in FIG. 2, the control unit 210 may include a processor 220, a radio module 230, and a power module 250. The processor 220 may include or be coupled to a memory unit 221 and a navigation unit 225. The processor 220 may be configured with processor-executable instructions to control flight and other operations of the drone UE 200, including operations of the various embodiments. The processor 220 may be coupled to the payload-securing unit 212 and the landing sensors 256. The processor 220 may be powered from a power module 250, such as a battery. The processor 220 may be configured with processor-executable instructions to control the charging of the power module 250, such as by executing a charging control algorithm using a charge control circuit. Alternatively or additionally, the power module 250 may be configured to manage its own charging. The processor 220 may be coupled to a motor control unit 223 that is configured to manage the motors that drive the rotors 202. While the various components of the control unit 210 are illustrated in FIG. 2 as separate components, those skilled in the art will appreciate that some or all of the components (e.g., the processor 220, the motor control unit 223, the radio module 230, and other units) may be integrated together in a single device or module, such as a system-on-chip module.

According to various aspects, through controlling the individual motors of the rotors 202, the drone UE 200 may be controlled in flight as the drone UE 200 progresses toward a destination. The processor 220 may receive data from the navigation unit 225 and use such data to determine the present position and orientation of the drone UE 200, as well as the appropriate course towards the destination. In some embodiments, the navigation unit 225 may include a Global Navigation Satellite System (GNSS) receiver system (e.g., one or more GPS receivers) enabling the drone UE 200 to navigate using GNSS signals. For example, as used herein, the term "Global Navigation Satellite System," "GNSS," and variants thereof generally refer to any of various satellite-aided navigation systems, such as Global Positioning System (GPS) deployed in the United States, GLONASS used by the Russian military, and Galileo for civilian use in the European Union, as well as terrestrial communication systems that augment satellite-based navigation signals or provide independent navigation information. Alternatively or in addition, the navigation unit 225 may be equipped with radio navigation receivers for receiving navigation beacon or other signals from radio nodes, such as navigation beacons, wireless local area network (WLAN) access points, cellular network sites, radio stations, etc. Additionally, the processor 220 and/or the navigation unit 225 may be configured to communicate with a server through a wireless connection (e.g., a cellular data network) to receive data useful in navigation as well as to provide real-time position reports. An avionics module 229 coupled to the processor 220 and/or the navigation unit 225 may be configured to provide flight control-related information such as altitude, attitude, airspeed, heading, and similar information that the navigation unit 225 may use for navigation purposes, such as dead reckoning between GNSS position updates. The avionics module 229 may include or receive data from a gyro/accelerometer unit 227 that provides data regarding the orientation and accelerations of the drone UE 200 that may be used in navigation calculations.

According to various aspects, the radio module 230 may be configured to receive navigation signals, such as beacon signals from nearby base stations, signals from aviation navigation facilities, etc., and provide such signals to the processor 220 and/or the navigation unit 225 to assist in drone navigation. In some embodiments, the navigation unit 225 may use signals received from recognizable radio frequency (RF) emitters (e.g., AM/FM radio stations, WLAN access points, and cellular network base stations) on the ground. The locations, unique identifiers, single strengths, frequencies, and other characteristic information of such RF emitters may be stored in a database and used to determine position (e.g., via triangulation and/or trilateration) when RF signals are received at the radio module 230. Such a database of RF emitters may be stored in the memory unit 221 of the drone UE 200, in a ground-based server in communication with the processor 220 via a wireless communication link, or in a combination of the memory unit 221 and a ground-based server. Navigating using information about RF emitters may use any of various conventional methods. For example, upon receiving an RF signal via the radio module 230, the processor 220 may obtain a unique identifier (e.g., a service sector identification (SSID), a media access control (MAC) address, radio station call sign, cell ID, etc.), etc. associated with the signal and use that information to obtain the ground coordinates and signal strength of the detected RF emitter from the database of RF emitter characteristics. If the database is stored in the onboard memory unit 221, the processor 220 may use the RF emitter identifier information to perform a table look up in the database. Alternatively or in addition, the processor 220 may use the radio module 230 to transmit the detected RF emitter identifier to a Location Information Service (LIS) server, which may return a location of the RF emitter as obtained from an RF emitter location database. Using the coordinates of the RF emitter and optionally the signal strength characteristics, the processor 220 (or the navigation unit 225) may estimate the location of the drone UE 200 relative to those coordinates. Using locations of three or more RF emitters detected by the radio module 230, the processor 220 may determine a more precise location via trilateration. Estimates of location based on received ground-based RF emitters may be combined with position information from a GNSS receiver to provide more precise and reliable location estimates than achievable with either method alone.

According to various aspects, the processor 220 may use the radio module 230 to conduct wireless communications with one or more wireless communication devices 270 such as beacon, a server, smartphone, tablet, or other device with which the drone UE 200 may be in communication. A bi-directional wireless communication link 234 may be established between transmit/receive antenna 232 of the radio module 230 and transmit/receive antenna 272 of the wireless communication device 270. For example, the wireless communication device 270 may be a cellular network base station or cell tower. The radio module 230 may be configured to support multiple connections with different wireless communication devices 270 having different radio access technologies. In some embodiments, the wireless communication device 270 may be connected to a server or provides access to a server. In an example, the wireless communication device 270 may be a server of a drone operator, a third party service (e.g., package delivery, billing, etc.), etc. The wireless communication device 270 may alternatively and/or also be a server associated with the operator of the drone UE 200, which may communicate with the drone UE 200 through a local access node or through a data connection maintained through a cellular connection. In various embodiments, the drone UE 200 may communicate with a server via an intermediate communication link such as one or more network nodes or other communication devices.

According to various aspects, the radio module 230 may be configured to switch between a cellular connection and a WLAN connection depending on the location and altitude of the drone UE 200. For example, while in flight at an altitude designated for drone traffic, the radio module 230 may communicate with a cellular infrastructure in order to maintain communications with a server (e.g., wireless communication device 270). An example of a flight altitude for the drone UE 200 may be at around four-hundred (400) feet or less, such as may be designated by a government authority (e.g., FAA) for drone flight traffic. At this altitude, establishing communication with some of the wireless communication devices 270 using short-range radio communication links (e.g., WLAN links) may be difficult. Therefore, communications with other wireless communication devices 270 may be established using cellular telephone networks while the drone UE 200 is at flight altitude. Communication between the radio module 230 and the wireless communication device 270 may transition to a short-range communication link (e.g., a WLAN or Bluetooth link) when the drone UE 200 moves closer to the wireless communication device 270.

According to various aspects, drones such as the drone UE 110 illustrated in FIG. 1, the drone UE 200 illustrated in FIG. 2, etc. may generally operate under radio conditions that differ from radio conditions under which devices on the ground operate. For example, among other differences, interference conditions that exist at higher altitudes may substantially differ from interference conditions on the ground (e.g., because there may be fewer obstructions, fewer nearby devices transmitting and receiving wireless signals, etc.). Interference conditions in the air can further vary depending on the height at which a drone may be operating. As such, in addition to potentially having difficulty differentiating between ground UEs and drone (e.g., high altitude) UEs, a wireless network may have difficulty distinguishing among drone UEs that operate at different heights. Furthermore, radio resource management (RRM) used to manage co-channel interference, radio resources, and other radio transmission characteristics in wireless communication systems may not be optimized to handle the different radio conditions under which drones and ground devices operate.

Figure 3:
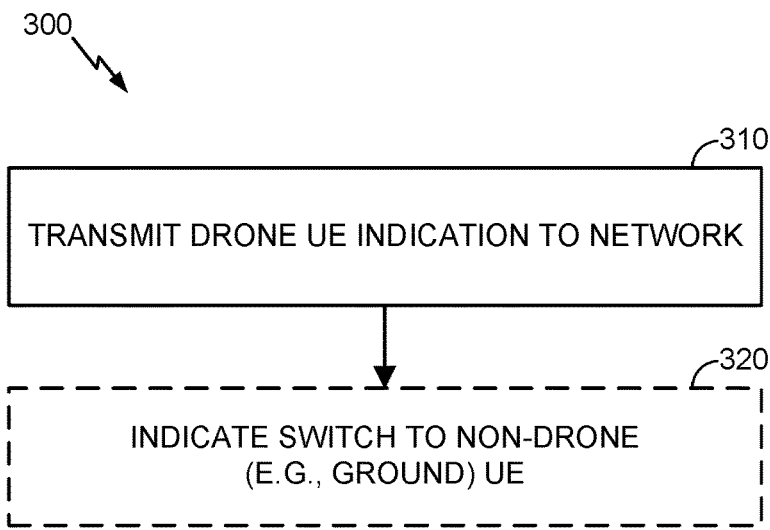
FIG. 3 illustrates an exemplary method to provide a drone UE indication to a wireless network, according to various aspects.

As such, according to various aspects, FIG. 3 illustrates an exemplary method 300 to provide a drone UE indication to a wireless network, which may help the wireless network to at least distinguish between ground UEs and drone UEs configured to operate at higher altitudes. In general, according to various embodiments, a drone UE may transmit a "drone UE" indicator to the wireless network at block 310. As such, based on the drone UE indicator, the wireless network may differentiate the drone UE that can operate at higher altitudes from other UEs that only operate on the ground. For example, in various embodiments, the drone UE indicator may be supportive of an uplink (UL) heavy traffic configuration because drone UEs may often be used to stream video, images, etc. on the uplink while ground UEs may have higher downlink (DL) traffic demands. In various embodiments, the drone UE indicator may be transmitted to the wireless network when the drone UE connects to the wireless network. For example, in various embodiments, the drone UE may convey the drone UE indicator using Radio Resource Control (RRC) signaling (e.g., as an Informational Element (IE) included in an RRC connection request transmitted to the wireless network when transitioning from an idle to connected mode). In another example, the drone UE indicator may be conveyed using non-access stratum (NAS) signaling during an NAS attach procedure when attaching to the wireless network (e.g., during initial power-up), using Medium Access Control (MAC) signaling during a Random Access Procedure (RACH), and/or in other suitable ways. Accordingly, as will be apparent to those skilled in the art, the drone UE indicator can be suitably conveyed to the wireless network using existing signaling procedures through which a UE can indicate a category associated therewith. In particular, the above-mentioned signaling procedures are conventionally used to indicate a UE category that defines combined uplink and downlink capabilities and/or other suitable capabilities such that the wireless network can communicate with the UE correctly based on the applicable category. In the present case, the drone UE indicator may convey that the UE is an unmanned aircraft system having flight capabilities, which may provide the wireless network with the ability to differentiate drone UEs from ground UEs and appropriately configure communications for a particular UE depending on whether the UE is operating in the air or on the ground.

According to various aspects, the drone UE may alternatively and/or additionally transmit the drone UE indicator to the wireless network at block 310 in response to an event trigger. For example, in various embodiments, the event trigger may be the start of flight, in which case the drone UE indicator may be transmitted to the wireless network when the drone UE begins flight (e.g., through RRC signaling, a MAC control element, etc.). In another example, the event trigger may be reaching a certain height threshold, whereby the drone UE indicator may be transmitted to the wireless network when the drone UE reaches the height threshold. Furthermore, according to various aspects, the drone UE indicator may be dynamically configurable, in that the drone UE may operate like a ground UE until if and/or when a defined event trigger occurs (e.g., when the drone UE begins a flight, crosses a particular height threshold, etc.). In such examples, as depicted in optional block 320, the drone UE may subsequently indicate a switch to a non-drone (e.g., ground) UE in response to determining that a suitable event trigger has occurred. For example, in various embodiments, the drone UE may indicate the switch to a ground UE or other suitable non-drone UE upon landing, upon crossing below a particular height threshold (e.g., the same or a different height threshold than used as the trigger to report the drone UE indicator), etc.

Accordingly, conveying the drone UE indicator and/or indicating a switch to a non-drone (e.g., ground) UE may allow the wireless network to appropriately configure communications based on the radio conditions that may exist for the particular UE, which may be different on the ground and in the air. For example, signal strengths may be substantially stronger in the air relative to signal strengths on the ground due to free space propagation conditions that exist in the air. Furthermore, handover performance may be substantially superior in the air due to increased stability of signals with free space propagation relative to signals that are subjected to multipath, shadowing, and clutter experienced on the ground. Other potential differences in the radio conditions that exist in the air versus radio conditions on the ground may include, but are not limited to, drone UEs potentially causing more uplink interference in the network relative to ground UEs because the free space propagation increases interference energy received at neighbor cells, wherein more uplink interference may be experienced with increasing numbers of drone UEs present in the wireless network.

Accordingly, based on at least the foregoing considerations, conveying the drone UE indicator and/or indicating a switch to a non-drone (e.g., ground) UE may enable the wireless network to know whether a given UE is operating on the ground or in the air at any given point in time. The wireless network can thereby configure communications appropriately depending on whether the UE is operating on the ground or in the air. For example, one possible optimization may relate to power control, wherein uplink interference that occurs when a UE operates in the air may be reduced with open-loop power control (OLPC) approaches that are used to set a target signal strength at the serving cell and limit neighbor cell interference using downlink path loss estimation. As such, the wireless network may have the ability to support many more drone UEs with high uplink data rates without causing excess interference to the network or degrading performance for ground UEs, which may allow the wireless network to support substantial numbers of drone UEs that have high-bandwidth uplink transmission requirements (e.g., to support high-resolution video streaming use cases).

According to various aspects, using the drone UE indicator to allow the wireless network to differentiate UEs operating in the air from UEs operating on the ground may also support optimizations related to generating neighbor lists. For example, in a typical approach, the wireless network may receive reports from connected UEs regarding which cells are detected, which are then used to create neighbor lists to support mobility. However, because the radio conditions in the air differ from the radio conditions on the ground, the cells that are detectable in the air may be different from the cells that are detectable on the ground. Accordingly, in various embodiments, the wireless network may configure one neighbor list for UEs that are operating on the ground and a second neighbor list for UEs operating in the air, wherein the drone UE indicator may allow the wireless network to appropriately configure the neighbor list for a particular UE depending on whether the UE is operating in the air or on the ground.

Figure 4:
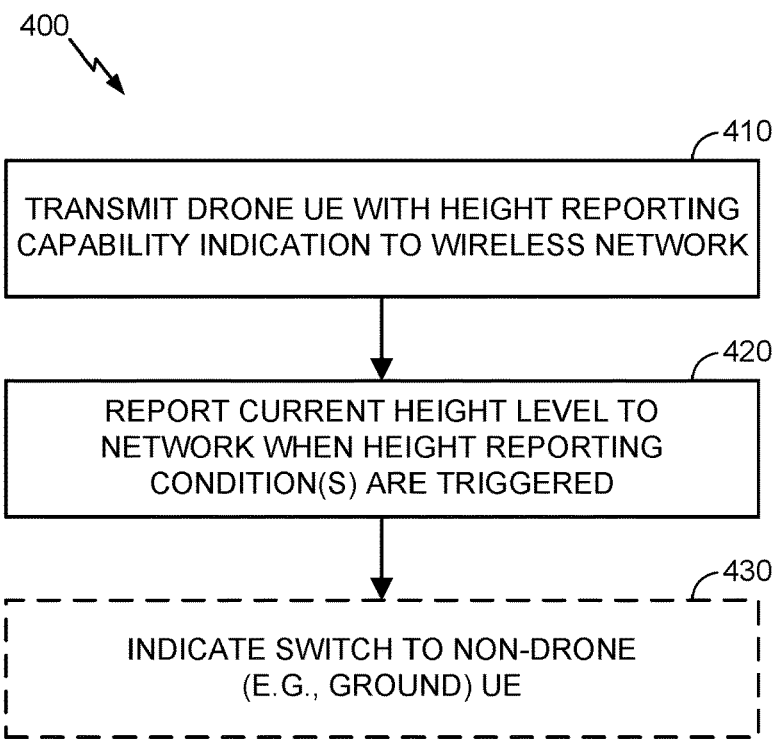
FIG. 4 illustrates an exemplary method to provide a drone UE indication with height reporting capabilities to a wireless network, according to various aspects.

According to various aspects, FIG. 4 illustrates another method 400 to provide a drone UE indication to a wireless network. More particularly, the method 400 shown in FIG. 4 may be used to indicate a drone UE that also has height reporting capabilities, which may enable the wireless network to further differentiate among drone UEs that are operating at different heights. According to various embodiments, at block 410, a drone UE that has appropriate height reporting capabilities may transmit a drone UE with height reporting capability indicator to the wireless network. In various embodiments, a special indicator may be used to convey that the UE is a drone UE that has height reporting capabilities. Alternatively, in various embodiments, the UE may indicate the status as a drone UE and separately indicate the height reporting capabilities (e.g., in the same message or in different messages). In various embodiments, a drone UE may generally have height reporting capabilities when equipped with suitable components that can obtain or otherwise provide an altitude either alone or in combination with other flight control-related information (e.g., attitude, airspeed, heading, etc.). In various embodiments, the drone UE and height reporting capability indicator(s) may be transmitted to the wireless network when the drone UE connects to the wireless network and/or begins a flight. For example, in various embodiments, the indicator(s) may be conveyed using Radio Resource Control (RRC) signaling (e.g., as an Informational Element (IE) included in an RRC connection request), using non-access stratum (NAS) signaling during an NAS attach procedure, using Medium Access Control (MAC) signaling during a Random Access Procedure (RACH), etc.

According to various aspects, at block 420, the drone UE may report a current height level associated therewith to the wireless network upon triggering any applicable height reporting condition(s). For example, in various embodiments, the drone UE may be configured to report the current height level associated therewith to the wireless network at periodic intervals. In another example, the height reporting condition(s) may be event-based, in that the drone UE may be configured to report the current height level associated therewith upon crossing above or below a particular height level. In other examples, the height reporting condition(s) may be event-based and periodic, combined with other RRM measurements and reporting, or otherwise configured. For example, in various embodiments, the drone UE may be configured to report a location (e.g., GPS coordinates) in combination with a current height, which may enable the drone UE to be located in three-dimensional airspace (e.g., at a given height above a ground location that maps to the reported location). In another example, the drone UE may be configured to report a distance to one or more detected base stations, wherein the distance reporting may be relative to a serving base station and estimated based on a detected timing difference of a received synchronization signal. Accordingly, one or more base stations in the wireless network that are configured to communicate with the drone UE may find the reported height information, the location information, the distance information, etc. to be useful to configure power control parameters, manage interference, provide mobility management, generate neighbor lists, and/or implement procedures to configure and/or manage any suitable radio resource (e.g., access stratum signaling). Furthermore, the reported height level may be used to control beamforming, either alone or in combination with any optionally provided location and/or distance information, in that one or more directional antenna can be pointed toward the drone UE at least temporarily to thereby provide an optimal signal to the drone UE.

According to various aspects, in a similar manner as described above with reference to FIG. 3, the drone UE with height capability indicator(s) may be dynamically configurable, in that the drone UE may operate like a ground UE until if and/or when a defined event trigger occurs (e.g., when the drone UE begins a flight, crosses a particular height threshold, etc.). In such examples, as depicted in optional block 430, the drone UE may subsequently indicate a switch to a non-drone UE in response to determining that a suitable event trigger has occurred (e.g., upon landing, upon crossing below a particular height threshold, etc.). Alternatively and/or additionally, the drone UE may report a zero height level or a height level equivalent to a ground location upon landing.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for providing a drone user equipment (UE) indication, comprising:
connecting to a wireless network by a UE having flight capabilities; and
transmitting, by the UE, a drone UE indicator to the wireless network to indicate that the UE is an unmanned aircraft system having the flight capabilities, wherein the drone UE indicator is transmitted to the wireless network as part of a Radio Resource Control (RRC) connection request, during a non-access stratum (NAS) attach procedure, or using Medium Access Control (MAC) signaling during a Random Access Procedure (RACH) when establishing the connection to the wireless network.

2. The method recited in claim 1, wherein the drone UE indicator is transmitted to the wireless network in response to an event trigger related to one or more of the UE beginning a flight or crossing above a height threshold.

3. The method recited in claim 1, further comprising indicating, by the UE to the wireless network, a switch to a ground UE mode in response to an event trigger related to one or more of the UE landing or crossing below a height threshold.

4. The method recited in claim 1, wherein the wireless network is configured to provide the UE an uplink heavy traffic configuration based on the drone UE indicator.

5. The method recited in claim 1, further comprising:
estimating a distance to a detected base station based on a detected timing difference of a synchronization signal received from the detected base station; and
reporting the estimated distance to the detected base station to the wireless network, wherein the estimated distance to the detected base station is reported relative to a serving base station.

6. The method recited in claim 1, wherein the UE has height reporting capabilities in addition to the flight capabilities, and wherein the drone UE indicator transmitted to the wireless network further indicates that the UE has the height reporting capabilities.

7. The method recited in claim 6, further comprising:
determining a current height level associated with the UE; and
reporting the current height level to the wireless network.

8. The method recited in claim 7, wherein the current height level is reported to the wireless network at one or more of periodic intervals, based on the current height level crossing above or below a particular value, or in combination with other radio resource management measurements that are reported to the wireless network.

9. The method recited in claim 7, wherein one or more base stations in the wireless network are configured to point one or more directional antenna toward the UE based at least in part on the current height level.

10. An apparatus, comprising:
at least one processor configured to connect to a wireless network; and
a transmitter configured to transmit a drone user equipment (UE) indicator to the wireless network to indicate that the apparatus is an unmanned aircraft system that has flight capabilities wherein the drone UE indicator is transmitted to the wireless network as part of a Radio Resource Control (RRC) connection request, during a non-access stratum (NAS) attach procedure, or using Medium Access Control (MAC) signaling during a Random Access Procedure (RACH) when connecting to the wireless network.

11. The apparatus recited in claim 10, wherein the drone UE indicator is transmitted to the wireless network in response to an event trigger related to one or more of the apparatus beginning a flight or crossing above a height threshold.

12. The apparatus recited in claim 10, wherein the transmitter is further configured to transmit, to the wireless network, information indicating a switch to a ground UE mode in response to an event trigger related to one or more of the apparatus landing or crossing below a height threshold.

13. The apparatus recited in claim 10, wherein the at least one processor is further configured to estimate a distance to a detected base station based on a detected timing difference of a synchronization signal received from the detected base station and to report, to the wireless network, the estimated distance to the detected base station relative to a serving base station.

14. The apparatus recited in claim 10, wherein:
the drone UE indicator transmitted to the wireless network further indicates that the apparatus has height reporting capabilities, and
the at least one processor is further configured to determine a current height level associated with the apparatus and report the current height level to the wireless network.

15. The apparatus recited in claim 14, wherein the current height level is reported to the wireless network at one or more of periodic intervals, based on the current height level crossing above or below a particular value, or in combination with other radio resource management measurements that are reported to the wireless network.

16. The apparatus recited in claim 15, wherein one or more base stations in the wireless network are configured to point one or more directional antenna toward the apparatus based at least in part on the current height level.

17. The apparatus recited in claim 14, wherein one or more base stations in the wireless network are configured to point one or more directional antenna toward the apparatus based at least in part on the current height level.

18. An apparatus, comprising:
means for connecting to a wireless network; and
means for transmitting a drone user equipment (UE) indicator to the wireless network to indicate that the apparatus is an unmanned aircraft system that has flight capabilities, wherein the drone UE indicator is transmitted to the wireless network as part of a Radio Resource Control (RRC) connection request, during a non-access stratum (NAS) attach procedure, or using Medium Access Control (MAC) signaling during a Random Access Procedure (RACH) when connecting to the wireless network.

19. The apparatus recited in claim 18, wherein the drone UE indicator is dynamically configurable such that the drone UE indicator is transmitted to the wireless network in response to an event trigger related to one or more of the apparatus beginning a flight or crossing above a height threshold and information is transmitted to the wireless network to indicate a switch to a ground UE mode in response to an event trigger related to one or more of the apparatus landing or crossing below a height threshold.

20. The apparatus recited in claim 18, further comprising:
  means for estimating a distance to a detected base station based on a detected timing difference of a synchronization signal received from the detected base station; and
  means for reporting, to the wireless network, the estimated distance to the detected base station relative to a serving base station.

21. The apparatus recited in claim 18, wherein the drone UE indicator transmitted to the wireless network further indicates that the apparatus has height reporting capabilities, and wherein the apparatus further comprises:
  means for determining a current height level associated with the apparatus; and
  means for reporting the current height level to the wireless network at one or more of periodic intervals, based on the current height level crossing above or below a particular value, or in combination with other radio resource management measurements that are reported to the wireless network.

22. A computer-readable medium storing computer-executable instructions, the stored computer-executable instructions configured to cause a mobile device to:
  connect to a wireless network; and
  transmit a drone user equipment (UE) indicator to the wireless network to indicate that the mobile device is an unmanned aircraft system that has flight capabilities, wherein the drone UE indicator is transmitted to the wireless network as part of a Radio Resource Control (RRC) connection request, during a non-access stratum (NAS) attach procedure, or using Medium Access Control (MAC) signaling during a Random Access Procedure (RACH) when the mobile device is connecting to the wireless network.

23. The computer-readable medium recited in claim 22, wherein the drone UE indicator is dynamically configurable such that the drone UE indicator is transmitted to the wireless network in response to an event trigger related to one or more of the mobile device beginning a flight or crossing above a height threshold and information is transmitted to the wireless network to indicate a switch to a ground UE mode in response to an event trigger related to one or more of the mobile device landing or crossing below a height threshold.

24. The computer-readable medium recited in claim 22, wherein:
  the drone UE indicator transmitted to the wireless network further indicates that the mobile device has height reporting capabilities, and
  the stored computer-executable instructions are further configured to cause the mobile device to determine a current height level associated with the mobile device and report the current height level to the wireless network at one or more of periodic intervals, based on the current height level crossing above or below a particular value, or in combination with other radio resource management measurements that are reported to the wireless network.

* * * * *